May 7, 1929.  L. KOLOZSY  1,712,149
WIND POWER MECHANISM
Filed May 13, 1926
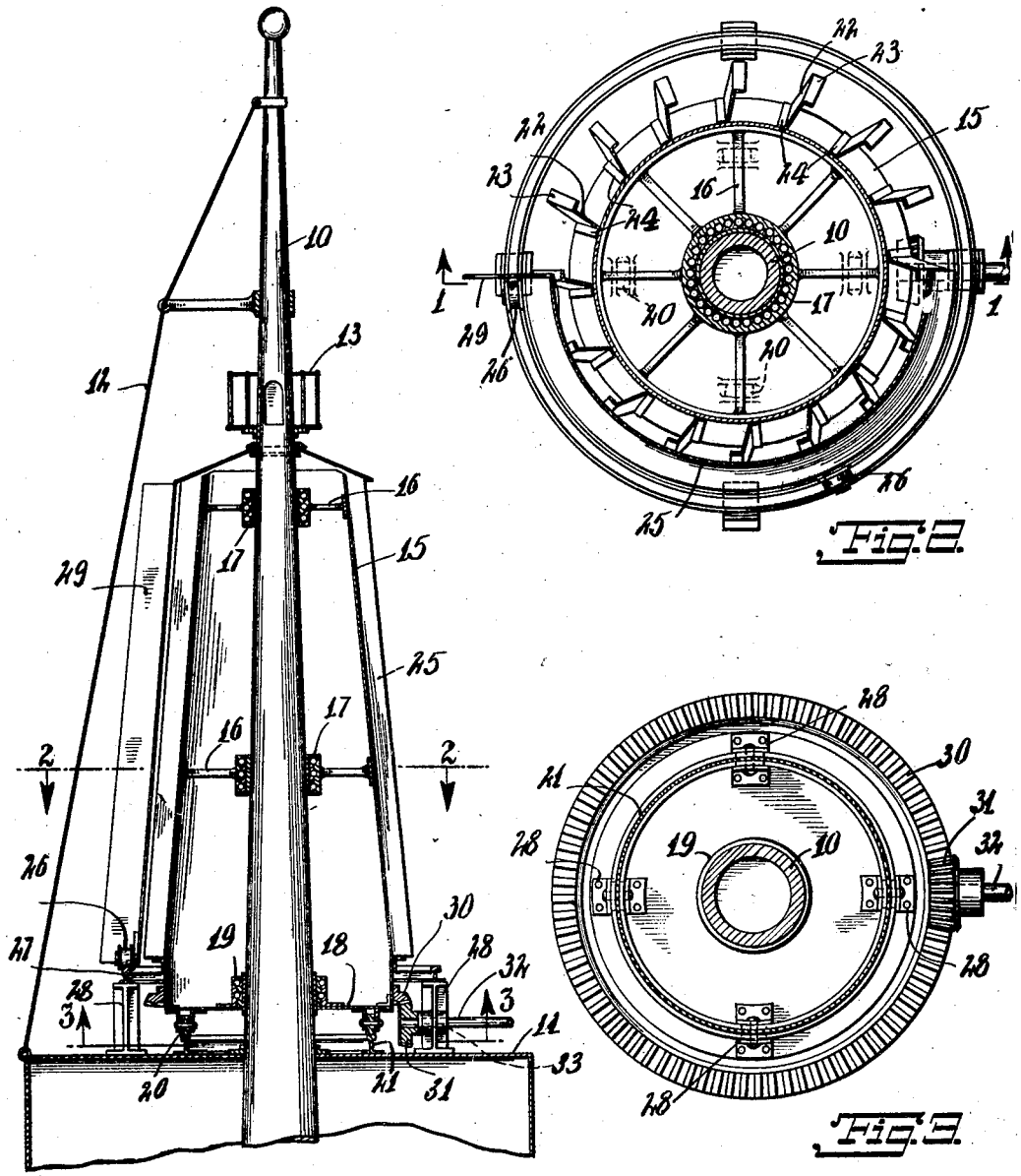
INVENTOR
Louis Kolozsy
BY
ATTORNEY Patented May 7, 1929.

1,712,149

UNITED STATES PATENT OFFICE.

LOUIS KOLOZSY, OF NEW YORK, N. Y.

WIND-POWER MECHANISM.

Application filed May 13, 1926. Serial No. 108,773.

This invention relates generally to wind motors used to propel ships and the like, the invention having more particular reference to a novel type of wind motor.

The invention has for an object the provision of a wind motor of simple construction and novel arrangement of parts.

A further object of the invention is the provision of a wind motor embodying a means of self adjusting, so as to permit the wind from a direction to rotate or drive the wind motor.

For further comprehension of the invention, and of the objects an advantages thereof, reference will be had to the following description and accompanying drawing, and to the appended claim in which the various novel features of the invention are more particuarly set forth.

Fig. 1, of the drawing, is a side elevational view of a mast such as used on ships illustrating my improved wind motor operatively attached thereto.

Fig. 2, is a transverse sectional view taken on the line 2—2 of Fig. 1.

Fig. 3, is a similar view taken on the line 3—3 of Fig. 1.

Fig. 4, is a fragmentary enlarged sectional view illustrating a modification of my improved wind motor.

The mast 10, supported by the deck 11, and the stay rope 12, and provided with a lookout 13, or crow's nest, are those of a ship such as commonly used. It being understood that I do not necessarily limit the use of my improved wind motor to masts as herein set forth, but rather to all types and classes of masts and the like as generally used on ships and the like.

As here embodied my improved wind motor comprises a frustro-conical shaped hollow member 15, provided with radial supports 16, extending inward therefrom, and adapted to support ball bearings 17, or the like, suitably attached to the above mentioned mast 10. The frustro-conical shaped hollow member 15, is also provided with a lower end 18, adapted to support a ball bearing 19, or the like, suitably attached to the said mast 10. The lower end 18 has rotatively attached thereto rollers 20, adapted to engage the circular track 21, mounted on and attached to the deck 11 of the said ship. The above described construction being such as will permit the frustro-conical shaped hollow member 15 to be rotated.

The blades 22, provided with extremities 23, formed or bent at right angles thereto, are attached, as at 24, by a suitable flange, to the frustro-conical shaped hollow member 15, and extend radially therefrom, so as to permit the wind to rotate the said frustro-conical shaped hollow member 15. The enclosing member 25, frustro semi-conical hollow shaped, and adapted to enclose, encase or cover one-half of the said frustro-conical shaped hollow member 15, is positioned adjacent to and directly outside the said rotors 22, and has rotatively attached thereto, rollers 26, adapted to engage the circular track 27, mounted on and attached to supports 28, suitably attached to the said deck 11 of the said ship. The enclosing member 25 is provided with a vane element 29, located at one edge of the said enclosing member 25 and extending to the rear therefrom. The above described construction being such as will permit the above mentioned wind to rotate the said enclosing member 25, as is commonly the case with weather vanes, so as to permit the said wind to rotate the frustro-conical shaped hollow member 15.

The bevel gear 30, is attached to the frustro-conical shaped hollow member 15, at or near the lower end 18, and meshes with a suitable bevel pinion 31, attached to the shaft 32, rotatively mounted as at 33, in one of the said supports 28.

The later described construction being such as will permit the said frustro-conical shaped hollow member 15 to rotate or drive the shaft 32, it is understood that the shaft 32 may be operatively connected to a propeller shaft or the like, so as to propel the said ship.

Referring in particular to Fig. 4, of the accompaying drawing, in which I have illustrated a modification of my improved wind motor, the disc member 35 is attached to the lower end 18 of the frustro-conical shaped hollow member 15, and is provided with a circular projecting element 36 adapted to engage a notch 37, formed on the periphery of the rollers 38. The disc member 39 is attached to the deck 11 of the said ship, and is provided with a circular projecting element 40 adapted to engage the notch 37 formed on the periphery of the rollers 38. The above described construction is such as will permit the rollers 38 to rotatively support the frustro-conical shaped hollow member 15. It should be understood that the said rollers 38 are positioned or located in close proximity so as to rigidly support the said frustro-conical shaped hollow member.

It will be further understood that my improved device as above described and set forth may be employed to drive all classes and types of machines or the like, and that whenever desirable the frustro-conical shaped members may be changed to cylindrical shape.

Having thus described my invention, what I claim as new and desire to protect by Letters Patent of the United States is as follows:

A wind machine comprising a vertically disposed hollow truncated cone mounted to rotate about its axis, vertically disposed blades on said cone, flanges on the outer end of said blades at right angles thereto, a semi-frustro-conical shield mounted to rotate around said cone and coaxial therewith, said shield having a vertical vane at one edge thereof, and means for transmitting the motion of said cone to a shaft.

In testimony whereof I have affixed my signature.

LOUIS KOLOZSY.